Sept. 1, 1964  G. H. ECKELS ETAL  3,146,893
DERRICK
Filed March 16, 1960  6 Sheets-Sheet 1

Fig. 1

INVENTORS
GEORGE H. ECKELS AND
CURTIS W. VERRELL
BY
Teare & Fetzer
ATTORNEYS

Sept. 1, 1964 G. H. ECKELS ETAL 3,146,893
DERRICK
Filed March 16, 1960 6 Sheets-Sheet 2

INVENTORS
GEORGE H. ECKELS AND
CURTIS W. VERRELL
BY
Teare & Felzer
ATTORNEYS

Sept. 1, 1964 G. H. ECKELS ETAL 3,146,893
DERRICK
Filed March 16, 1960 6 Sheets-Sheet 6

INVENTORS
GEORGE H. ECKELS AND
CURTIS W. VERRELL
BY
Teare + Fetzer
ATTORNEYS

United States Patent Office 3,146,893
Patented Sept. 1, 1964

3,146,893
DERRICK
George H. Eckels, Lakewood, and Curtis W. Verrell, Fairview Park, Ohio, assignors, by mesne assignments, to The Ohio Brass Company, Mansfield, Ohio, a corporation of New Jersey
Filed Mar. 16, 1960, Ser. No. 15,298
6 Claims. (Cl. 212—8)

This invention relates to derricks and more particularly to portable derricks, such as are adapted for instance to be mounted on motor trucks or other types of vehicles.

Such derricks are conventionally mounted on utility type vehicles for handling various objects, such as telephone or telegraph poles, and may be employed to advantage in conjunction with other types of equipment, such as an earth boring tool, for expeditiously performing all the necessary work operations associated with setting a utility line pole in proper place along a thoroughfare or the like.

Accordingly, an object of the invention is to provide an improved power operated derrick or crane particularly adapted for mounting on a vehicle.

Another object of the invention is to provide a corner mounted derrick or crane which is mounted for movement from an inactive carried position on a vehicle through a vertical arc of movement in excess of 180°, by a single fluid powered motor unit, and wherein novel means is provided for swiveling the derrick in a horizontal plane through an arc of movement of at least 180°, for selective positioning of the derrick laterally, rearwardly and transversely of the supporting vehicle.

A further object of the invention is to provide a derrick or crane of the latter mentioned type wherein the derrick boom may be selectively extended by powered reciprocal means, for materially increasing and adjusting the operating range of the derrick and while the latter is under load.

A further object of the invention is to provide a derrick having an extendible boom and including means for attaching an associated work mechanism, such as an earth boring tool, to the boom, and whereby means are provided in conjunction with the tool attaching means for selectively securing the associated work mechanism to either the extendible boom section of the relatively stationary section of the boom, thereby greatly increasing the range of movement and the useability of the associated work mechanism.

A still further object of the invention is to provide a powered derrick or crane which has a greatly improved range of movement as compared to heretofore known arrangements, which is particularly adapted for use in handling utility line poles and the like, and which includes means for supporting an associated work mechanism, such as an earth boring tool thereon, and in a novel manner, for selective positioning of the work mechanism over substantially the full range of movement of the derrick.

Briefly, the foregoing objects are accomplished by the provision of a derrick comprising an extendible boom pivotally mounted on a base member for movement from a forward, inactive, carried position overlying the vehicle, to rearward load supporting position, and through a vertical arc of movement having a range in excess of 180°. The boom is actuated by a single, fluid powered motor unit in conjunction with a linkage arrangement to provide the aforementioned vertical range of movement while giving optimum leverage characteristics to the derrick during its full range of vertical movement. The base is corner mounted on the vehicle and adapted for rotary movement in a generally horizontal plane about a generally vertical axis and through a horizontal arc of movement of at least 180°, for selective positioning of the boom laterally, transversely and/or rearwardly of the vehicle. The base is actuated in its rotary movement by a single reciprocal power unit in conjunction with a novel linkage arrangement to provide said 180° horizontal arc of movement, and the linkage is so arranged with respect to the base so as to provide for orientation of the free end of the boom, when in predetermined loading condition, forwardly of the rear end of the vehicle, so as to provide for utilization of the derrick for ready loading of objects onto and from the chassis of the vehicle, or in other words providing for effective body loading and unloading of the vehicle. Novel support means is provided on the boom for mounting an associated working mechanism, such as an earth boring tool, thereon, and latch and locking means are provided for selectively coupling the tool supporting means to either the extendible section of the boom upon such actuation of the latter, or the working mechanism may be detachably secured to the relatively stationary section of the boom, for convenient utilization of the extendible boom section without interference from the working mechanism.

Other objects and advantages of the invention will be apparent from the following description taken in conjunction with the accompanying drawings in which:

FIG. 6 is an enlarged, fragmentary, detail view of the motor unit and associated linkage mechanism for swiveling or rotating the derrick base through an arc of 180°, for lateral, transverse, and rearward positioning of the derrick with respect to the mounting vehicle; in full lines, the position of the parts are illustrated as disposed when the derrick boom is either in a forward carried position as illustrated, in full lines in FIG. 1, or in rearwardly swung load carrying position as illustrated in dot-dash lines in FIG. 1; in dotted lines in FIG. 6, the position of the parts are illustrated as disposed when the derrick base has been rotated by the motor unit to position the derrick boom laterally to one side of the vehicle; and in dot-dash lines, the position of the parts are illustrated as disposed when the derrick base has been rotated by the motor unit to position the derrick boom generally transverse of the vehicle for convenient body loading and unloading from the vehicle;

FIG. 8 represents a view taken from the opposite side of the boom as that illustrated in FIG. 4;

Figure 1:
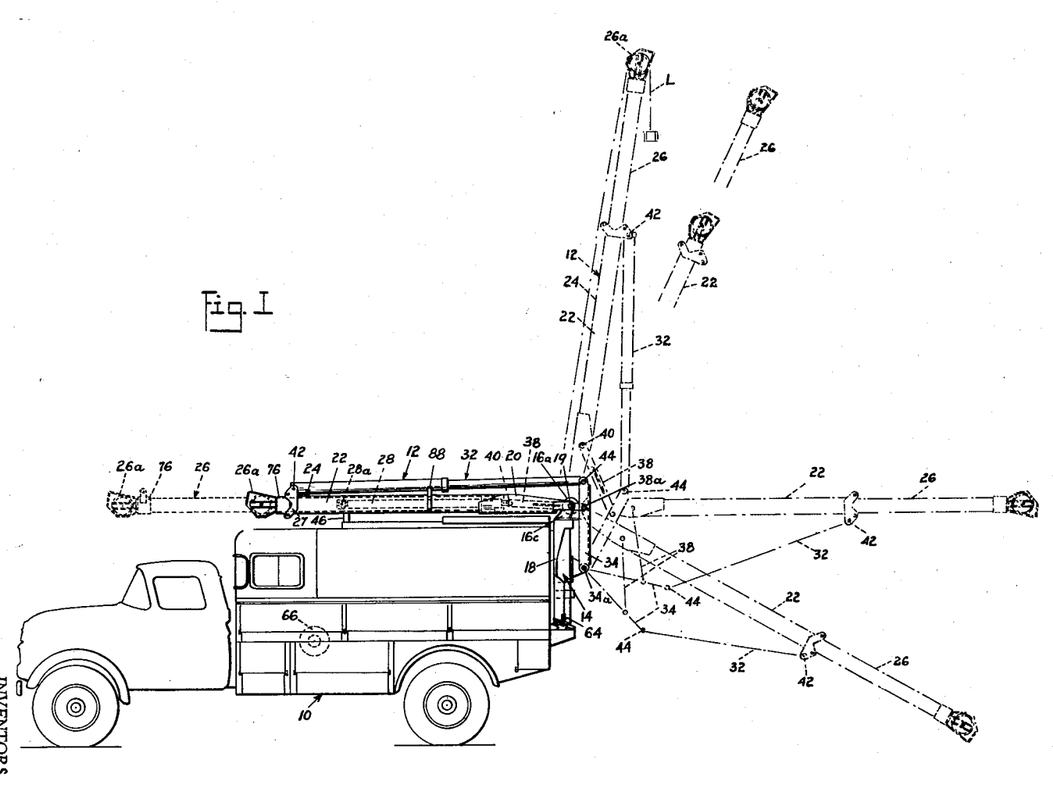
FIG. 1 is a side elevational view of a utility truck employing a derrick constructed in accordance with the invention; the mechanism for rotating the derrick in its horizontal plane of movement has been eliminated in the FIG. 1 showing for purposes of simplicity; in full lines, the carried position of the derrick on the vehicle is illustrated, with such full line showing, illustrating the extendible boom in retracted condition; in dotted lines projecting forwardly from such full line showing, an extended condition of the derrick boom is illustrated; and in dot-dash lines, various load carrying positions of the derrick boom are illustrated and partially in a diagrammatic manner, when the latter has been swung rearwardly from carried position on the vehicle.

Referring now again to the drawings, and in particular to FIG. 1, there is shown a wheeled utility vehicle 10 having a truck body which carries the derrick 12 of the invention thereon. The derrick is corner mounted on the truck chassis for rotary movement in a generally horizontal plane so that the derrick possesses a considerable lateral, rearward, and transverse range of movement, particularly useful in setting utility line poles in position along a right-of-way, without the necessity of continual moving and maneuvering of the truck itself.

Figure 14:
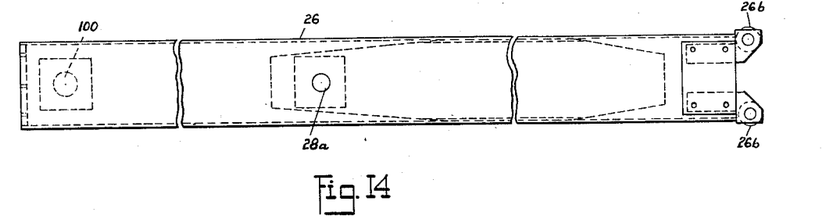
FIG. 14 is an enlarged, broken, detail view of the outer extendible section of the derrick boom.
Figure 15:
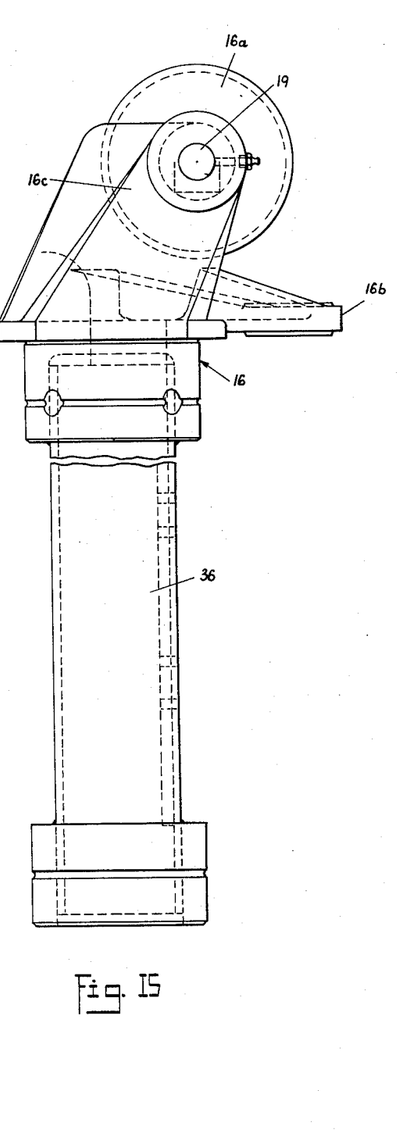
FIG. 15 is an enlarged, side elevational, broken detail view of the swivel or rotatable head portion of the base of the derrick.
Figure 16:
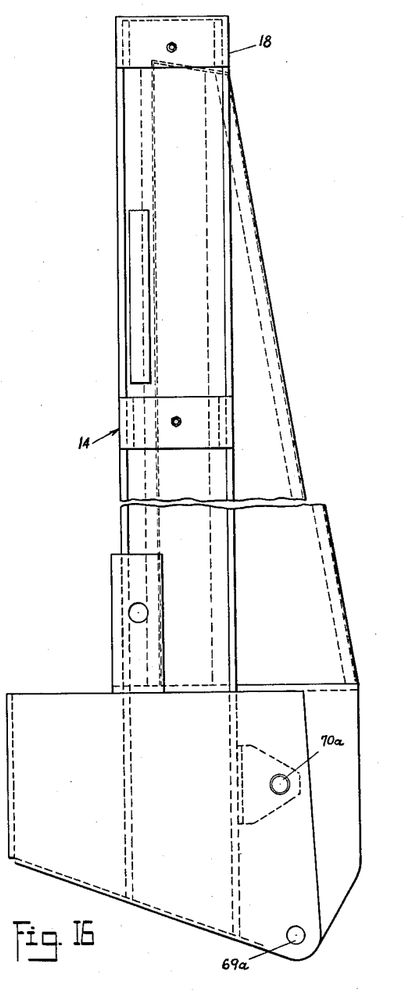
FIG. 16 is an enlarged, end elevational, broken view of the stationary head supporting portion of the base of the derrick, such stationary portion being adapted for mounting on a corner of the vehicle for rotatably supporting the derrick boom and associated rotary head portion of the base structure thereon.

The derrick comprises base structure 14 which is mounted in relatively stationary relation on the corner of the truck chassis, such base structure comprising a rotatable or swivel head portion 16 (FIGS. 1, 4 and 15) which is suitably journaled on the stationary portion 18 (FIGS. 1, 4 and 16) of the base structure, for rotary movement in a generally horizontal plane of movement. The head portion 16 rotatably mounts a sheave member 16a (FIG. 4) at its upper end, and includes a horizontally projecting arm 16b (FIG. 2) for use in rotating the head portion, as will be hereinafter described in detail. Head portion 16 also includes generally upstanding ears 16c (FIGS. 1, 4 and 15) thereon, which pivotally mount, as at 19, laterally spaced leg sections 20 of the inner or lower, relatively stationary section 22 of the boom 24 of the derrick. The boom 24 also embodies an outer extendible section 26 (FIGS. 1 and 14) which is received in telescoping relation in the lower or inner section 22 of the boom. Such outer extendible section mounts a conventional sheave assembly 26a, at its outer end. Interior rollers 26b (FIG. 4) are provided on the inner end of the extendible section 26, and exterior roller members 26c, are mounted by means of brackets 27, 27a on the outer end of relatively stationary section 22 of the boom, for facilitating the sliding telescopic movement of the extendible section 26 with respect to the relatively stationary section 22 of the boom. The relatively movable boom sections 22 and 26 are preferably of rectangular configuration in transverse cross section, and are substantially hollow, with the extendible boom section 26 mounting a fluid powered, double acting, reciprocal motor unit 28 therein, such as at 28a, and with the other end of the motor unit 28 (such as the outer end of the piston rod of the motor unit) being suitably anchored as at 28b to the relatively stationary section 22 of the boom. Accordingly it will be seen that selective supplying of fluid pressure to the motor unit 28 will selectively move or slide the outer extendible section 26 lengthwise with respect to the relatively stationary section 22 of the boom. In FIG. 1, in full lines as aforementioned, the boom in its inactive or carried position on the vehicle and in completely telescoped condition is illustrated, with dotted lines showing the extended condition of the extendible section 26 of the boom.

The boom, as aforementioned, is pivotally mounted as at 19 to the head portion 16 of base structure 14, and a linkage erecting or actuating arrangement 30 (FIG. 4) is provided, together with a double acting reciprocal fluid powered motor unit or ram 32, for moving the derrick in a generally vertical plane and through an arc of movement in excess of 180°.

The linkage erecting arrangement 30 takes the form of an arm or link 34 pivotally mounted as at 34a to a bracket 34b which in turn is attached to depending shank portion 36 (FIG. 15) of rotary head 16 of the base structure 14 of the derrick. Bracket 34b as shown is disposed well below and projects slightly rearwardly of the pivotal connection 19 of the derrick boom to the head 16 of the base structure 14 of the derrick. Secondary arms or links 38 (FIGS. 2 and 4) are pivotally connected as at 38a to the first mentioned arm 34, and extend upwardly therefrom to be pivotally connected as at 40 to the boom 24. As can be best seen in FIG. 1, the bifurcated base portion 20 of the boom receives links 38 therebetween in non-interfering relation in the collapsed or carried position of the derrick.

The double acting reciprocal fluid-powered motor unit 32 is pivotally secured at one end as at 42 to aforementioned brackets 27, 27a mounted adjacent the outer end of relatively stationary inner section 22 of the derrick boom, and at the other end of the motor unit, the latter is secured as at 44 adjacent the upper end of link 34.

Referring now to FIG. 1, the inactive or forwardly carried position of the derrick is shown in full lines with the derrick being disposed in a generally horizontal position overlying the vehicle. Support or rest structure 46 may be provided extending upwardly from the vehicle for supporting the derrick thereon in the carried position thereof. In such carried position, motor unit 32 may extend rearwardly from its pivotal connection 42 to the derrick and along the derrick in slightly diagonally upward relation therefrom as shown. When it is desired to swing or erect the derrick through its vertical arc of movement to a work or load carrying position, pressurized fluid is fed to motor unit 32 as via distributing port 47 (FIG. 4) thus, causing inward telescoping relation of the latter, and thus pulling the derrick upwardly and rearwardly about its pivotal connection 19 to head 16 of the base structure of the derrick. In FIG. 1 there is shown various work or load carrying positions of the derrick in its vertical plane of movement, and it will be seen that the range of movement thereof is in excess of 180° from the derrick's inactive or carried position to its maximum rearwardly swung position. With the arm or link 34 of the erecting linkage 30 being disposed rearwardly of the pivotal connection 19 of the derrick boom to its base structure, and with the extendible motor unit 32 disposed generally rearwardly of the derrick boom 24 during the load supporting portion of the vertical arc of movement of the derrick, various load supporting positions being substantially those illustrated in FIG. 1 in phantom lines, the pivotal connection 44 of the ram 32 to the erecting linkage 30 is disposed at all times as great a distance as possible from the pivotal connection 19 of the derrick to supporting head structure 16 on the vehicle, and with such distance from the pivot 44 to the pivot 19 rapidly increasing as the boom is swung rearwardly through its vertical arc to its various work positions. Such an arrangement provides for optimum application of effective force by the extensible motor unit 32 to the derrick boom to move the latter, and especially during the load supporting portion of the derrick's arc of movement, and yet provides for the convenient storage of the derrick in overlying relation over the vehicle, and out of interfering or rearwardly projecting relation with respect to the vehicle, and as can be most clearly seen from FIG. 1 of the drawings. It will be seen that links 34, 38 coacting between the derrick boom 24 and the vehicle cause rearward pivotal movement of link 34 about its pivotal connection 34a to the derrick base structure and thus movement of connection 44 away from the derrick pivot 19, to thereby increase the effective force applied to the derrick by motor unit 32 during rearward swinging of the derrick from its carried position to load carrying position, and throughout the operating range of the derrick. Furthermore, it will be seen that the distance between pivots 44 and 19 is greatest when the boom is in its rearwardmost and lowermost position, thus providing optimum effective force from the motor unit 32 for actuating the derrick, when the latter's power needs are the greatest.

To collapse the derrick and return it to its carried position, or to swing it forwardly about the pivot 19 to change its work position in its load supporting portion of its vertical arc of movement, pressurized fluid is fed to the inner end of the extendible motor unit 32 as via fluid distributing port 47a, to cause outward telescoping movement of the motor unit 32 and pivot the derrick boom about its pivotal connection 19 of the vehicle, while arms or links 34, 38 are swung counterclockwise, as viewed in FIG. 1, to thereby move the arm 34 to generally vertically extending nonrearwardly projecting storage position, when the derrick arrives at its generally horizontal carried or storage position on the vehicle.

Referring now to FIG. 6, the arrangement for rotating the base of the derrick in a generally horizontal plane and through a horizontal working arc of 180° is as follows: A bracket 50 is secured to the stationary portion 18 of base structure 14 and an articulated linkage arrangement 52 is provided coacting between bracket 50 and aforementioned arm 16b on the rotatable head portion 16, together with a double acting reciprocal motor unit 54, for rotating the rotatable head portion 16 in the aforementioned horizontal arc of movement. The linkage 52 comprises a first or driver link 56 of intermediately inwardly bent configuration pivoted as at 56a to bracket 50 and a second or follower bent link 58 pivotally connected as at 58a to link 56 and pivotally connected as at 58b to the outer end of arm 16b. The piston rod 60 of motor unit 54 is pivotally connected to link 56 as at 60a and the cylinder portion 61 of motor unit 54 is pivoted as at 60b to a bracket 62 mounted on the truck. The full line position of linkage 52 and motor unit 54 represents the position of the rotary head portion 16 when the boom 24 is either in a storage position, overlying the truck chassis in parallel alignment with the lengthwise vertical center plane of the truck chassis and as shown in full lines in FIG. 1, or when the boom has been moved through a vertical arc about its pivotal connection 19 to the head portion and thus to rearward load supporting position but still disposed in a vertical plane parallel to the vertical center plane of the truck chassis. In dotted lines identified by the letter A, the position of the linkage 52 and associated actuating motor unit 54 is illustrated for positioning the boom laterally to project outwardly from the corresponding side of the truck, for use as for instance in conveniently setting a utility line pole along a thoroughfare, with the truck located parallel to the curb of the thoroughfare, and with the boom 24 having been pivoted about its pivotal connection 19 and as by means of the aforementioned motor unit 32 to a load carrying position. In such position, the location of the winch line sheave 26a on the outer end of the boom has been illustrated and designated by the number 26a'. In dot-dash lines referred to by the letter B, the position of the arm 16b of the rotatable head 16 and associated actuating linkage 52 has been shown when the ram 54 has been extended to rotate head portion 16 and associated projecting arm 16b, 180° from the A position to thereby swing the boom 24, when in loading position, 180°, whereby the winch line sheave 26a on the outer end of the boom is disposed in the position designated by number 26a", for readily utilizing the boom to load and/or unload objects, such as a pole, from the truck body itself. It will be seen that in the latter position of the boom and winch line sheave, the latter is actually disposed forwardly of the rear end C of the truck, and convenient to the open space S on the truck body for effective loading and unloading thereof. It will be seen that the articulated linkage arrangement 52 in conjunction with the inwardly bent configuration of the individual links 56, 58 makes it possible to utilize a ram type motor to swing the arm 16b a full 180° and around the relatively stationary portion 18 of base structure 14, for positioning the boom 24 and associated winch line sheave 26a in a location for use in readily loading or unloading an object from the truck, while still providing for positioning of the boom 24 laterally or rearwardly of the truck for convenient handling of objects, such as the aforementioned utility line poles. It will also be observed from FIG. 6 that the horizontal arc of movement of the base 16 and arm portion 16b in a clockwise direction (as viewed in FIG. 6) and from the full line position of the base to the dot-dash position referred to by reference letter B, is greater than 90°, while the counterclockwise arc of movement of the base and arm portion from the full line position to the dotted line position referred to by reference letter A, is less than 90°. Such an arrangement provides for the positioning of the boom generally transverse of the rearward end of the truck and in a manner whereby the winch line sheave assembly 26a on the free end of the boom is disposed forwardly of such rearward extremity of the truck for convenient body loading and unloading of the latter, as well as for positioning of the boom laterally of the corresponding side of the truck and when the boom is in load supporting condition, and yet still necessitating for the base 16 and arm portion 16b, a horizontal arc of movement of only 180°, such 180° horizontal arc of movement being able to be provided by the relatively economical and non-interfering arrangement of reciprocal motor unit 54 due to the novel linkage mechanism 52, as aforementioned.

Figure 3:
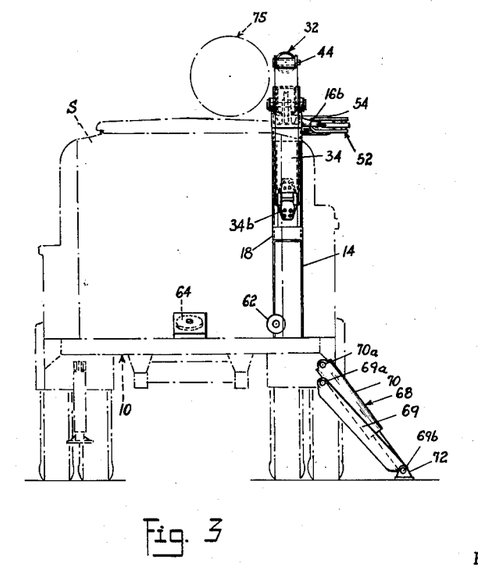
FIG. 3 is a rear end, elevational view of the derrick as mounted on the truck, with the derrick being in the inactive carried position illustrated in FIG. 2.
Figures 4, 5:
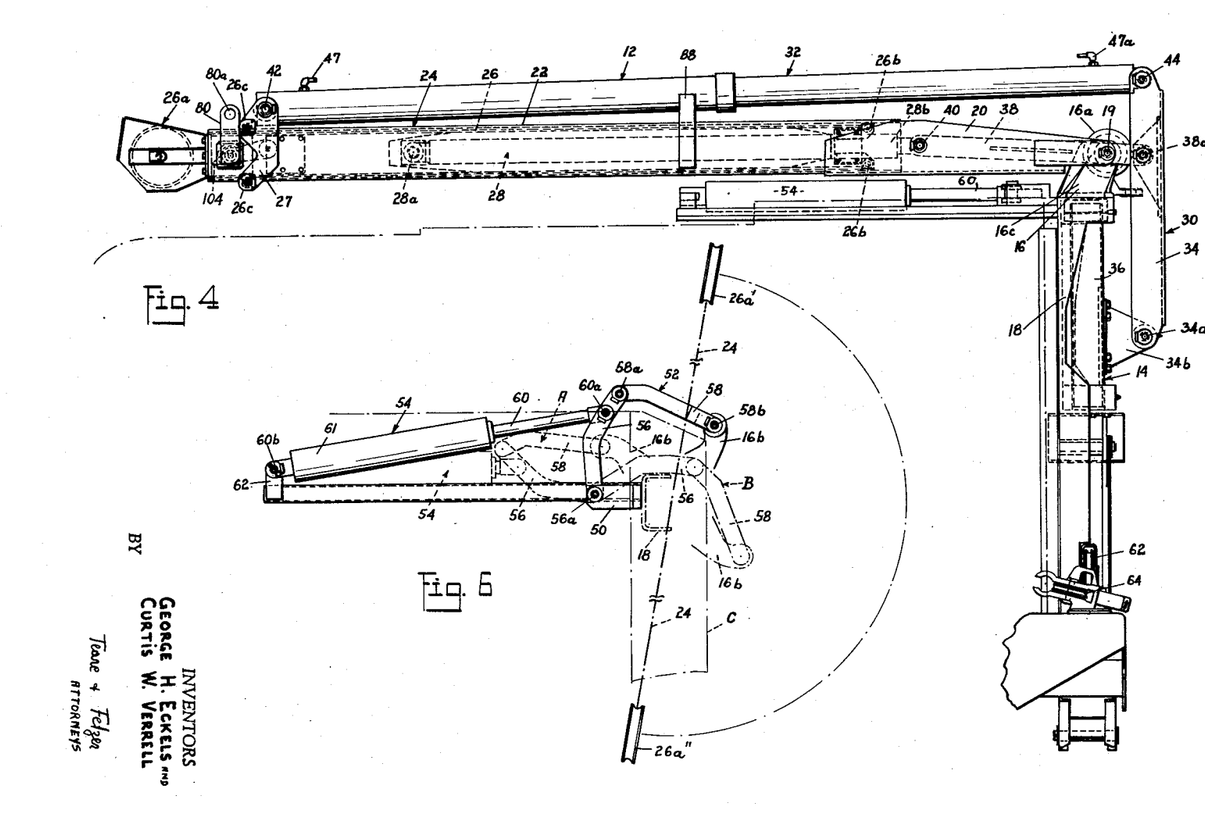
FIG. 4 is an enlarged, side elevational, detail view of the derrick mechanism as mounted on a truck, and illustrates the structure providing for extension of the outer section of the boom with respect to the inner section thereof.
FIG. 5 is an enlarged, fragmentary, elevational view taken from the right hand end of FIG. 4.
Figure 5:
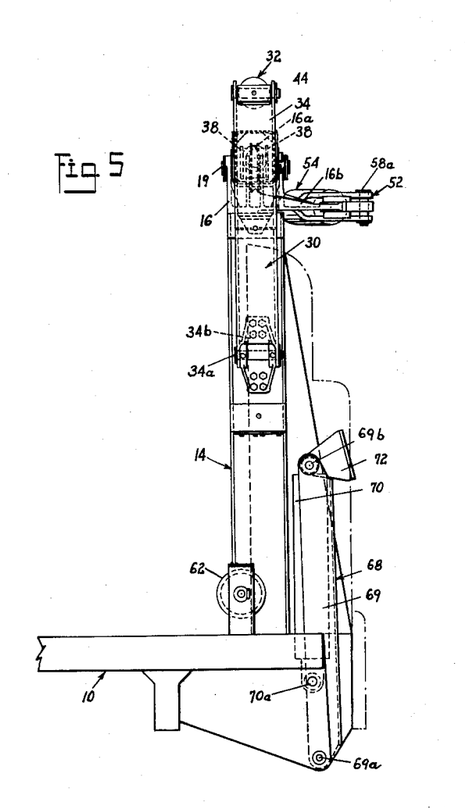
Figure 7:
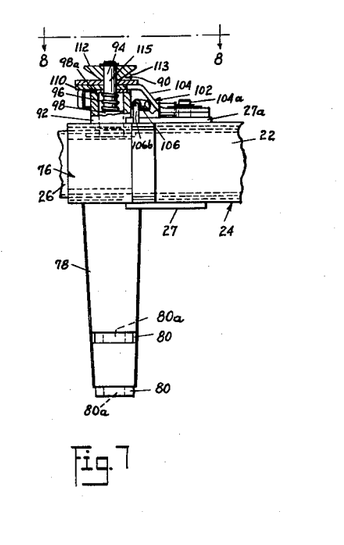
FIG. 7 is an enlarged, fragmentary, partially sectioned, top plan view illustrating the outer end portion of the relatively stationary inner section of the extendible boom of the derrick, together with the collar device for mounting an associated work mechanism, such as the earth boring tool illustrated in FIG. 2 of the drawings, on the extendible boom, and showing the latching and the locking mechanism which provides for selectively securing the collar device to either the outer extendible section of the boom, or to the inner relatively stationary section of the boom.
Figure 8:
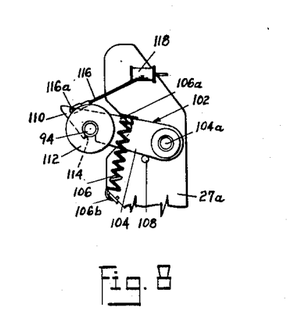
FIG. 8 is a fragmentary view, taken substantially along the plane of line 8—8 of FIG. 7, looking in the direction of the arrows, and illustrating the latching mechanism in latched condition with the collar device for maintaining the latter in coupled relation to the inner relatively stationary section of the extendible boom.
Figure 9:
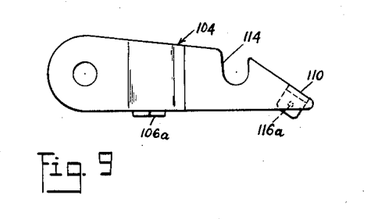
FIG. 9 is an enlarged, elevational, detail view of the latching lug shown in FIGS. 7 and 8.
Figure 10:
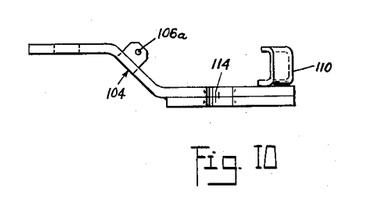
FIG. 10 is a top plan view of the FIG. 9 showing.
Figure 11:
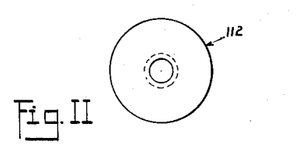
FIG. 11 is an enlarged, elevational, detail view of the cam member of the latching lug assembly shown in FIGS. 4, 7 and 8, which cam member provides for automatically unlocking the collar member from the extendible outer section of the boom, and locking it to the relatively stationary inner section of the boom, upon retraction of the extendible boom section to its innermost position.
Figure 12:
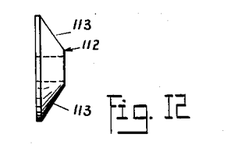
FIG. 12 is an end elevational, detail view of the FIG. 11 showing.

Referring now to FIGS. 1, 3 and 4, the winch line L of the derrick may pass about sheave 26a on the outer end of the boom 24, then along the boom to aforementioned sheave 16a, rotatably mounted on the head portion 16 of the base of the derrick, then down along the base to sheave 62, rotatably mounted on stationary base structure 14, then laterally to a rotatable sheave 64 disposed in generally horizontal position on the truck body and then forwardly to a preferably powered winch mechanism 66, for actuating the load line L in any position of the derrick.

A hydraulically actuated stabilizing jack mechanism 68, FIGS. 3 and 5, may be provided on the corner of the truck on which the derrick is mounted, for stabilizing the truck chassis during utilization of the derrick. Such jack mechanism may comprise the jack arm 69 pivotally connected as at 69a to the truck body and pivotally connected as at 69b to a fluid powered, double acting ram 70 which in turn is pivoted at its other end as at 70a to the truck body in upwardly spaced relation with respect to pivot 69a of the jack arm. Extension of the ram 70 causes swinging of the jack arm 69 together with its supporting foot portion 72, downwardly to ground engaging, stabilizing position as shown in FIG. 3, and retraction of ram 70 will swing arm 69 and foot 72 upwardly to the inactive position illustrated in FIG. 5.

Figure 2:
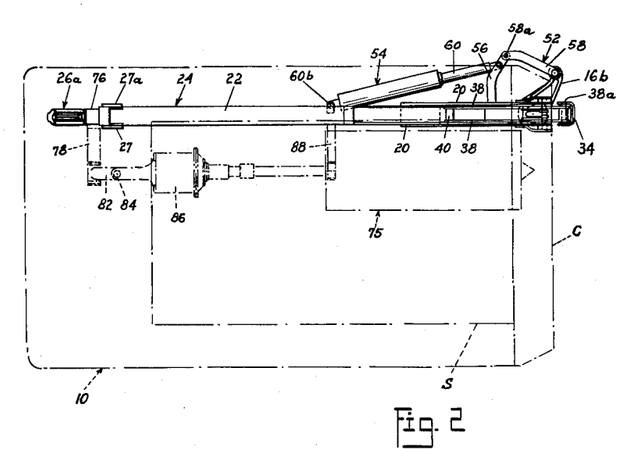
FIG. 2 is a top plan view of the derrick of FIG. 1, illustrating the same in inactive carried position on the vehicle, and showing the motor unit and associated linkage mechanism for rotating the derrick in its horizontal plane of movement; in phantom lines, an associated work tool, which in the embodiment illustrated represents an earth boring tool, is shown secured to the derrick.
Figure 13:
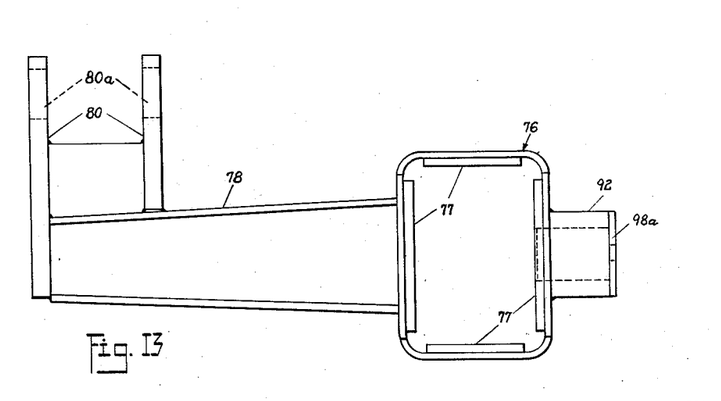
FIG. 13 is an enlarged, end elevational view of the collar device shown in FIGS. 4, 7 and 8 of the drawings.

Referring now to FIGS. 7, 8, 9, 10, 11 and 12, the latter best illustrate the novel arrangement for selective coupling of an associated work tool, such as the earth borer mechanism 75 diagrammatically illustrated in FIG. 2, to either the extendible section 26 of the boom or to the relatively stationary section 22 of the boom. Such an arrangement comprises a collar or tool supporting member 76 (FIG. 13), formed complementary to and encompassing the extendible section 26 of the boom, and preferably having wear plates 77 secured about its interior, for receiving in relatively movable relation the extendible section 26 of the boom. The collar embodies an arm 78 projecting laterally outwardly from one side thereof and which includes attaching lugs 80 at its outer end. Lugs 80 are apertured as at 80a for receiving therebetween pivoted member 82 (FIG. 2), the latter being pivotally connected as at 84 to the power unit 86 of earth boring tool 75. The earth boring tool may be conveniently supported on the truck when the derrick is in carried position by arm or bracket 88 (FIGS. 2 and 4), projecting laterally outwardly from the relatively stationary section 22 of the boom, and rigidly attached thereto.

Locking mechanism 90 (FIG. 7) is provided for locking collar 76 to the extendible section 26 of the boom when it is desired to carry the work tool 75 and supporting collar 76 outwardly with extension of the outer section 26 of the boom with respect to the inner section 22 thereof. Such locking means comprises a housing section 92 (FIGS. 7 and 13) projecting laterally of the collar in a direction opposite to the direction of projection of arm 78. A plunger 94 is slidably mounted in housing 92 and a compression spring 96 coacts between the head 98 (FIG. 7) of the plunger and the confronting wall 98a of housing 92 to resiliently urge plunger 94 transversely and inwardly toward the collar 76 and extendible section 26 of the boom.

An opening 100 (FIG. 14) complementary to the head 98 of the plunger 94 is formed in the confronting side of extendible section 26 of the boom, for receiving the plunger head therein, and upon occurrence of the latter, the collar 76 and associated working tool 75 will be locked to the extendible section 26 of the boom and will be carried outwardly therewith upon extension of the boom by actuation of motor unit 28. Thus the working tool 75 can be readily positioned lengthwise of the boom by locking the collar 76 to the extendible section 26 of the boom and actuating motor unit 28.

Latching mechanism 102 (FIGS. 7, 8, 9, 10, 11 and 12) is provided for automatically latching the collar 76 and supported working tool 75 to the inner, relatively stationary section 22 of the boom 24 upon retraction of the extendible section 26 of the boom its full amount within the inner boom section. Such latching mechanism comprises a latch member 104 pivoted as at 104a to supporting bracket 27a on the outer end of the inner section 22 of the boom, and a tension spring element 106, coacting between the latch 104 as at 106a and attaching lug 106b on the bracket 27a for urging the latch member 104 into latching position. A stop 108 (FIG. 8) is provided on bracket 27a for engagement with the latch 104, and limiting its upward pivotal movement under the action of spring 106. The latch 104 comprises a sharpened or converging head portion 110 (FIGS. 9 and 10) adapted for camming coaction with truncated lift cone element 112 mounted on the outer end of plunger element 94, for automatically moving the plunger element 94 laterally outwardly against the resistance to compression of spring 96 upon coacting camming engagement between head portion 110 of the latch 104 and the inwardly converging cam surfaces 113 of the truncated lift cam member 112. The head portion 110 of the latch is provided with an upwardly opening slot 114 therein which receives the shank 115 (FIG. 7) of the plunger when the collar 76 is latched to the inner section 22 of the boom. A flexible element, such as cable 116 (FIG. 8), is secured to the head of the latch member as at 116a and is passed through a cable tube 118 secured to bracket 27a, and then is strung to any convenient location for ready accessibility to the derrick operator, to provide for deactivating the latch 104 and permitting the plunger to engage in complementary opening 100 in the extendible section 26 of the boom. It will be seen that by pulling on cable 116, the latch 104 is pivoted downwardly out of latching engagement with plunger 94 and against the resistance to tension of spring 106, to thereby permit the spring 96 to urge the plunger head 98 into opening 100 in the confronting side of the extendible section 26 of the boom. The resistance to tension of latch spring 106 is greater than the resistance to compression of plunger spring 96, and therefore the plunger will normally be readily urged out of complementary opening 100 in the outer boom section upon camming coaction between head portion 110 of latch 104 and cam member 112. It will be seen therefore that the latch member 104 provides an arrangement whereby the work tool supporting collar member 76 and associated work tool will be automatically coupled to the inner, relatively stationary section of the boom upon retraction of the outer extendible section 26 into the inner, relatively stationary section 22, to thereby permit subsequent extension of the boom without interference from the work tool, and for use as for instance in loading and unloading purposes, and which may be readily deactivated, to cause automatic coupling of the collar 76 and associated work tool to the extendible section 26 of the boom, to permit carrying of the work tool outwardly with the boom, and adjustment of the position of the work tool lengthwise with respect to the boom and for the full operating range of the boom extension.

The terms and expressions which have been employed are used as terms of description and not of limitation and there is no intention in the use of such terms and expressions of excluding any equivalents of the features shown or described or portions thereof, but it is recognized that various modifications are possible within the scope of the invention claimed.

We claim:

1. A portable collapsible type derrick comprising a base mounted on a support for rotary movement in a generally horizontal plane, means for rotating said base, a boom pivotally mounted at one end on said base for swinging movement in a generally vertical plane from a forward storage position to rearward load supporting position, said boom comprising an inner section and an outer extendible section adapted for lengthwise telescoping relation with said inner section for varying the effective length of said boom, means including a reciprocal motor unit for telescoping said outer boom section with respect to said inner boom section, and means for moving said boom from said storage position to load supporting position and vice-versa, said last mentioned means comprising powered reciprocal means pivotally connected at one end thereof to the boom outwardly therealong from the pivotal connection of said boom to said base, said powered reciprocal means being disposed above said boom in said storage position thereof, link means pivotally connected to said base downwardly from the pivotal connection of said boom to said base, said link means being disposed generally rearwardly of said pivotal connection of said boom to said base and being adapted for pivotal movement in a generally vertical plane and with respect to said base, the other end of said reciprocal means being pivotally connected to said link means outwardly therealong from the pivotal connection of said link means to said base, and second link means extending between said first link means and said boom and being pivotally connected thereto, the pivotal connection of said second link means to said boom being disposed above a horizontal plane passing through the pivotal connection of said second link means to said first link means throughout the range of pivotal movement of said boom, said second link means operating to pivot said first link means rearwardly away from the pivotal connection of the said boom to said base upon actuation of said powered reciprocal means to move said boom from storage position to load supporting position, to thereby pivot said reciprocal means outwardly from said boom about its pivotal connection to said boom and away from the pivotal connection of said boom to said base.

2. In a portable derrick in accordance with claim 1 wherein said base is mounted for rotation on a pedestal-like support and said base comprises an arm projecting in a generally horizontal direction outwardly from said base, said arm being disposed generally rearwardly of said base in said storage position of said boom, said means for rotating said base comprising a powered reciprocal motor unit and articulated linkage mechanism, said articulated linkage mechanism comprising a first driver link pivotally mounted at one end to the support forwardly of and adjacent to said base, said driver link projecting generally laterally outwardly of said base when the latter is oriented to dispose said boom in said storage position, a follower link pivotally connected at one end thereof to said driver link and pivotally connected at the other end thereof to said arm, said last mentioned motor unit being pivotally connected to the support forwardly of said base and at the other end thereof being pivotally connected to said driver link adjacent to pivotal connection of said driver link to said follower link, said driver and follower links being of inwardly bent configuration in plan view whereby the latter may extend around said pedestal-like base support upon actuation of said last mentioned motor unit to thereby permit rotation of said base 180° in a horizontal plane, the pivotal connection of said last mentioned motor unit to the support being so positioned as to provide for swinging of said base and arm through an arc of movement in excess of 90° in one direction and less than 90° in the opposite direction, from said storage position of said boom.

3. A portable derrick comprising a base mounted on a support for rotary movement through a range of at least 180° in a generally horizontal plane, means for rotating said base, a jib type boom pivotally mounted at one end on said base for swinging movement in a generally vertical plane from a forward storage position overlying said support to rearward load supporting position, said boom comprising an inner section and an outer extendible section adapted for lengthwise telescoping relation with said inner section for selectively varying the effective length of said boom, means including a reciprocal motor unit for telescopically moving said outer boom section with respect to said inner boom section, and means for swinging said boom from said storage position to load supporting position and vice-versa, said last mentioned means comprising powered reciprocal means disposed above said boom when the latter is in said storage position and pivotally coupled at one end thereof to said boom, said powered reciprocal means extending rearwardly along said boom to a point disposed rearwardly of the pivotal connection of said boom to said base when said boom is in said storage position, first link means extending between the rearward end of said powered reciprocal means and a pivotal connection on said base and being pivotally coupled thereto, said last mentioned pivotal connection being disposed below the elevation of the pivotal connection of said boom to said base, second link means extending between said first link means and said boom and being pivotally connected thereto, the pivotal connection of said second link means to said boom being disposed above a horizontal plane passing through the pivotal connection of said second link means to said first link means throughout the range of pivotal movement of said boom, said second link means operating to pivot said first link means rearwardly away from the pivotal connection of said boom to said support upon actuation of said powered reciprocal means to move said boom from its storage position to load supporting position, to thereby pivot said reciprocal means outwardly from said boom about its pivotal connection to said boom and away from the pivotal connection of said boom to said base.

4. In combination, a vehicle, a collapsible type derrick located on a rear corner of the vehicle and comprising a base mounted on a pedestal-like support on said corner of the vehicle for rotary movement in a generally horizontal plane, said base comprising an arm projecting generally horizontally outwardly from said base, a boom pivotally mounted at one end on said base for swinging movement in a generally vertical plane and from a generally horizontally disposed storage position overlying the vehicle in parallel relation to the longitudinal vertical center plane of the vehicle, to rearward load supporting position and vice-versa, said arm extending diagonally rearwardly in outward projecting relation to the vertical plane of the corresponding side of the vehicle in said storage position of said boom, means for rotating said base in said horizontal plane through an arc of movement of 180°, said means comprising a horizontally disposed reciprocal motor unit and an articulated linkage mechanism, said motor unit being pivotally connected at one end thereof to said vehicle and at the other end thereof to said articulated linkage mechanism, said articulated mechanism and said motor unit being so arranged that said boom may be disposed so as to extend laterally of said side of the vehicle and may be disposed transversely of said vehicle with the free end of said boom being positioned forwardly of the rear end of the vehicle when said boom is in load supporting position and upon predetermined selective actuation of said motor unit, said boom comprising an inner section pivotally attached to said base and an outer extendible section adapted for lengthwise telescoping relation with said inner section for varying the effective length of said boom, a reciprocal motor unit coacting between said boom sections for telescoping said outer boom section with respect to said inner boom section, and means for moving said boom from said storage position to load supporting position and vice-versa, said last mentioned means comprising a powered reciprocal piston and cylinder unit pivotally connected at one end thereof to said inner boom section and disposed above said boom when the latter is in said storage position, link means pivotally connected to said base downwardly from the pivotal connection of said boom to said base, said link means being disposed generally rearwardly of said pivotal connection of said boom to said base and being adapted for pivotal movement in a generally vertical plane coplanar with the vertical plane of movement of said boom, the other end of said piston and cylinder unit being piovtally connected to said link means adjacent the free end of said link means, and second link means extending between said first link means and said inner boom section and being pivotally connected thereto, the pivotal connection of said second link means to said boom being disposed above a horizontal plane passing through the pivotal connection of said second link means to said first link means throughout the range of pivotal movement of said boom, said second link means operating to pivot said first link means rearwardly away from the pivotal connection of said boom to said base upon actuation of said piston and cylinder unit to move said boom from storage position to load supporting position, to thereby pivot said piston and cylinder unit outwardly from said boom about its pivotal connection to said inner boom section and away from the pivotal connection of said boom to said base.

5. In combination, a vehicle, a collapsible type derrick located on a corner of the vehicle and comprising a base mounted on said corner of the vehicle for rotary movement in a generally horizontal plane, said base comprising an arm projecting generally horizontally outwardly from said base, a boom pivotally mounted at one end on said base for swinging movement in a generally vertical plane and from a generally horizontally disposed storage position overlying the vehicle to rearward load supporting position, said boom being telescopically extensible and including a fluid powered reciprocal motor unit disposed interiorly of said boom for selectively varying the effective length of said boom, said arm extending diagonally rearwardly in outward projecting relation to the vertical plane of the corresponding side of the vehicle in said storage position of said boom, and means for rotating said base in said horizontal plane through an arc of movement of 180°, said means comprising a reciprocal motor unit and articulated linkage mechanism, said articulated linkage mechanism comprising a first driver link pivotally mounted at one end to the vehicle forwardly of and adjacent to said base, said driver link projecting generally laterally outwardly of said base when the latter is oriented to dispose said boom in said storage position, a follower link pivotally connected at one end thereof to said driver link and pivotally connected at the other end thereof to said arm, said motor unit being pivotally connected to the vehicle forwardly of said base and at the other end thereof being pivotally connected to said driver link adjacent the pivotal connection of said driver link to said follower link, said motor unit extending diagonally rearwardly with respect to said side of said vehicle when said boom is in said storage position, said links being of inwardly bent configuration in plan view whereby the latter may extend around said corner on which said base is mounted upon actuation of said last mentioned motor unit, said base being rotatable in said horizontal plane by said motor unit the pivotal connection of the last mentioned motor unit to the vehicle being so positioned that said base and arm are swingable in one direction through an arc of movement in excess of 90° and in the opposite direction through an arc of movement of less than 90° from said storage position, whereby the free end of said boom can be positioned in overlying relation to the vehicle as well as laterally to one side of the vehicle, when said boom is in said load supporting position.

6. In the combination in accordance with claim 5, wherein said derrick is mounted on the right hand rear corner of said vehicle, said base and associated arm being rotatable in a clockwise direction through an arc of movement in excess of 90° and being rotatable in a counterclockwise direction through an arc of movement of less than 90° from said storage position whereby said boom can be positioned either laterally of the right hand side of said vehicle or can be positioned so as to extend generally transverse and forward of the rearward end of said vehicle when said boom is disposed in said load supporting position.

References Cited in the file of this patent

UNITED STATES PATENTS

| | | |
|---|---|---|
| 1,499,938 | Leedom | July 1, 1924 |
| 2,786,581 | Balogh | Mar. 26, 1957 |
| 2,831,589 | Way | Apr. 22, 1958 |
| 2,956,691 | Fangman | Oct. 18, 1960 |
| 2,980,263 | Troche et al. | Apr. 18, 1961 |
| 3,043,443 | Hall | July 10, 1962 |